(12) United States Patent
Raccurt et al.

(10) Patent No.: US 12,162,961 B2
(45) Date of Patent: Dec. 10, 2024

(54) SPECIFIC MATERIALS THAT CAN BE USED FOR THE DETECTION OF AT LEAST ONE ALKALINE ELEMENT

(71) Applicant: COMMISSARIAT À L'ENERGIE ATOMIQUE ET AUX ÉNERGIES ALTERNATIVES, Paris (FR)

(72) Inventors: Olivier Raccurt, Grenoble (FR); Aurélien Auger, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 704 days.

(21) Appl. No.: 17/082,370

(22) Filed: Oct. 28, 2020

(65) Prior Publication Data

US 2021/0122837 A1    Apr. 29, 2021

(30) Foreign Application Priority Data

Oct. 29, 2019 (FR) ...................................... 1912127

(51) Int. Cl.
*C08B 37/08* (2006.01)
*G01N 21/78* (2006.01)
*H01M 10/0525* (2010.01)
*H01M 10/48* (2006.01)

(52) U.S. Cl.
CPC .......... *C08B 37/003* (2013.01); *G01N 21/78* (2013.01); *H01M 10/0525* (2013.01); *H01M 10/48* (2013.01)

(58) Field of Classification Search
None
See application file for complete search history.

(56) References Cited

U.S. PATENT DOCUMENTS

2016/0097755 A1 * 4/2016 Leclaire ................. G01N 31/02
                                                             506/13
2016/0276717 A1    9/2016 Goldsmith

FOREIGN PATENT DOCUMENTS

WO    0136378 A1    5/2001
WO    03018531 A1    3/2003

OTHER PUBLICATIONS

Ruiz-Cruz et al. "New chitosan-imine derivatives: from green chemistry to removal of heavy metals from water", Nov. 2018, Universidad De Antioquia, No. 89, pp. 34-43, Oct.-Dec. 2018 (Year: 2018).*
Libre Texts, 7.9: How Delocalized Electrons Affect pKa Values, 2014, LibreTexts (Year: 2014).*

(Continued)

*Primary Examiner* — Paul S Hyun
*Assistant Examiner* — Mickey Huang
(74) *Attorney, Agent, or Firm* — Pearne & Gordon LLP

(57) ABSTRACT

A material that can be used for detecting at least one alkaline element in cationic form chosen from polymers or inorganic materials, the material being functionalised by at least one group, referred to as group A, comprising one or more aromatic rings, the or all or a portion of the aromatic rings comprising at least one imine substituent and the or all or a portion of the aromatic rings comprising at least one atom carrying a free doublet within the or all or a portion of the rings and/or at least one other substituent different from an imine substituent comprising at least one atom carrying a free doublet.

21 Claims, 1 Drawing Sheet

(56) References Cited

OTHER PUBLICATIONS

Taguet et al., Grafting of Commercially Available Amines Bearing Aromatic Rings onto Poly(vinylidene-co-hexafluoropropene) Copolymers, 2006, Journal of Polymer Science Part A: Polymer Chemistry, vol. 44, issue 6, p. 1785-2138 (Year: 2006).*
Bui et al., Dynamic covalent Schiff-base silicone polymers and elastomers, Nov. 2018, Polymer, vol. 160, Jan. 3, 2019, pp. 282-290 (Year: 2018).*
Chen et al., "Chitosan as a functional additive for high performance lithium-sulfur batteries", J. Mater. Chem. A, 2015, 3, 15235 (Year: 2015).*
Rinki et al., "Preparation of Chitosan Based Scaffolds Using Supercritical Carbon Dioxide", Macromol. Symp. 2009, 277, 36-42 (Year: 2009).*
Kaya et al., "Synthesis and characterization of imine polymers of aromatic aldehydes with4-amino-2-methylquinoline via oxidative polycondensation", 2014, Designed Monomers and Polymers, 2015 vol. 18, No. 1, 89-104 (Year: 2014).*
Cathell, Matthew D et al. : "Structurally colored thiol chitosan thin films as a platform for aqueous heavy metal in detection" Biomacromolecules, American Chemical Society US, vol. 9, No. 1, Jan. 2008; pp. 1525-7797.
Search Report for French Application No. FR 1912127 dated Jul. 6, 2020.

* cited by examiner

SPECIFIC MATERIALS THAT CAN BE USED FOR THE DETECTION OF AT LEAST ONE ALKALINE ELEMENT

CROSS-REFERENCE TO RELATED APPLICATIONS

This application claims priority from French Patent Application No. 1912127 filed on Oct. 29, 2019. The content of this application is incorporated herein by reference in its entirety.

TECHNICAL FIELD

The present invention relates to the use of specific materials that can be used to detect and even quantify an alkaline element in ionic form and, more specifically cationic lithium, by a mechanism that involves a complexation and a change in a given optical magnitude (for example, the absorbance or the fluorescence).

This invention can have an application in all fields that require detecting this type of element such as:
- the field of the environment, in particular, monitoring the state of pollution of a given medium by alkaline elements;
- the field of recycling materials that comprise this type of element, for example, active materials with an alkaline element base entering into the constitution of electrodes for metal alkaline-ion batteries;
- the field of monitoring the state of the operation and even of the degradation over time of a metal alkaline-ion battery, such as a lithium-ion battery.

These latter two fields of application are particularly important in light of the increasing development in the last few years of metal alkaline-ion and, more specifically, lithium-ion batteries.

Indeed, batteries of this type perform particularly well as a source of autonomous energy, in particular, in portable electronic equipment (such as mobile telephones, portable computers, tools) and can also be used to provide the power supply required for the new microapplications, such as chip cards, sensors or other electromechanical systems as well as for electromobility.

From the point of view of their operation, these batteries operate according to the principle of ionic insertion-removal in the active materials of the electrodes.

More specifically, taking as an example, lithium-ion batteries, during the discharge process, the negative electrode releases lithium in ionic form Lit, which migrates through the ion-conductor electrolyte and is incorporated into the active material of the positive electrode in order to form an insertion material. The passage of each ion $Li^+$ in the internal circuit of the accumulator is exactly offset by the passage of an electron in the external circuit, thus generating an electric current.

On the other hand, during the charging process, the reactions occurring in the battery are the inverse reactions of the discharging, namely that:
- the negative electrode will incorporate lithium in the network of the material that forms it, in order to form an insertion material; and
- the positive electrode will release lithium, which will be incorporated in the material of the negative electrode in order to form an insertion material.

Exchanging lithium ions is therefore an essential parameter in the operation of these batteries. Moreover, the ageing of these batteries can result in a loss of capacity directly linked to a decrease in the number of lithium ions that can be exchanged between the negative electrode and positive electrode. This decrease can be linked to several phenomena, such as:
- the formation of an irreversible deposit of metal lithium on the surface of the negative electrode (instead of being inserted in the active material of this electrode), in particular when the charging is carried out at a low temperature and/or at a strong current (this phenomenon can be referred to as "lithium plating");
- after formation of the passivation layer SEI (Solid Electrolyte Interface) resulting from a reduction in the electrolyte at the negative electrode/electrolyte interface, the continuation of the growth of the latter beyond the first cycles, in particular when the initial SEI undergoes a phenomenon of cracking subsequent to the mechanical stresses generated by the changes in volume of the negative electrode;
- the loss of contact between the particles that constitute the electrode that can lead to an electrical isolation.

To estimate the state of operation or ageing of the batteries, it can be useful to be able to determine the local concentration in lithium ions during the operation of the latter. Indeed, locally measuring the concentration in lithium ions at the core of the battery and the change in the concentration during the service life of the latter could make it possible to better understand the degradation phenomena, such as those mentioned hereinabove and above all to monitor them in real time. The local measuring can also make it possible through a suitable processing of the information to precisely monitor the operation of the battery and thus improve the management of the latter by preventing in particular putting the battery in a configuration that prematurely accelerates the degradation thereof. By way of example, locally measuring the concentration in lithium ions within the battery can make it possible to detect the degradation phenomena described hereinabove and thus to limit, via a retroaction on the battery management system (known under the abbreviation BMS) the solicitation of the battery in an operating range that is both safe and non-degrading.

There is therefore a genuine need for developing new materials that can make it possible to detect an alkaline element or elements in cationic form and which are suitable and stable for implementation in a liquid medium, in particular an electrolytic liquid medium, such as the electrolytes of metal alkaline-ion batteries.

DESCRIPTION OF THE INVENTION

Thus, the inventors have developed materials that can be used to detect at least one alkaline element in cationic form chosen from polymers or inorganic materials, said materials being functionalised by at least one group, referred to as group A, comprising one or more aromatic rings, the or all or a portion of said aromatic rings comprising at least one imine substituent and the or all or a portion of said aromatic rings comprising at least one atom carrying a free doublet within the or all or a portion of said rings and/or at least one other substituent different from an imine substituent and comprising at least one atom carrying a free doublet.

Thanks to the presence of at least one imine substituent and of at least one atom carrying a free doublet present on the aromatic ring or rings and/or in at least one of the other substituents of said ring or rings, the materials are able to capture by complexation an alkaline element in cationic form and, following this complexation, to undergo a change in colour, which can be followed by a change in optical magnitude, such as the absorbance or the emission of fluorescence, which constitutes an indicator of the presence of said alkaline element and can make it possible to quantify it.

Moreover, because the materials are chosen from polymer materials and inorganic materials, the materials are able to be incorporated into many mediums, wherein the detection of an alkaline element is necessary, and can constitute stable sensors for said detection.

It is specified that the term "functionalised" means, in terms of the invention, a fixation of the aforementioned groups on the materials through the bias of covalent bonds either directly or via organic spacer groups (namely, organic groups that form a bridge between said materials and said groups A, which means, in other terms, that these organic spacer groups are bonded by a covalent bond to the materials and by another covalent bond to the groups A). By way of examples of organic spacer groups, mention can be made of alkylene groups.

When it is a question of polymers, the materials can be, in particular, materials that belong to the chitosan family, i.e. polyosides resulting from the random distribution of β-(1-4)-bonded D-glucosamine units and of N-acetyl-D-glucosamine units. More specifically, all or a portion of the D-glucosamine units can have their amine functions transformed into imine functions, said imine functions being those that belong to group(s) A, which means in other terms, that the group or groups A are bonded to the polymer material at the level of the positions initially occupied by these amine functions, which are converted into imine functions. In this particular case, the concerned polymer constitutes a remainder of chitosan, due to the fact that the amine functions are all or in part concerted into imine functions, which are now part of the groups A.

Thanks to the use of polymers and, in particular of polymers that belong to the chitosan family, the material is an entirely organic material and of natural origin (as chitosans are polyosides originating from the shells of crustaceans), has no toxicity and remains biodegradable even after use. All the more so, due to the capacity of a polymer to be deployed in the space and to make available the groups A in the three directions of space, the resulting materials are able to have an excellent capacity for detecting an alkaline element by catchment of the latter by the substituents carried by the groups A deployed in the space.

When it is a question of polymers, the materials can be, alternatively, polymers that belong to the polyterephthalate family (such as a polyethylene terephthalate, known under the abbreviation PET), polyolefins (for example, a polyethylene, a polypropylene), polyvinyl alcohols, polyamides, polytetrafluoroethylenes (known under the abbreviation PTFE), polyvinyl chlorides (known under the abbreviation PVC), polyvinylidene fluorides (known under the abbreviation PVDF), these polymers able to be those that enter into the constitution of battery separators. In this latter case, the materials of the invention can directly be an integral part of the battery separators, with the luminescence or the absorbance linked to the groups A able to be probed using either a waveguide, or optical fibres placed on the separator.

When the materials are inorganic materials, this can be:
a material made from one or more metalloid elements, such as silicon;
a material made from an oxide of one or more metal and/or metalloid elements, such as silica.

More specifically, when the materials are inorganic materials, this can be an inorganic material in the form of a support, such as a glass plate, a quartz plate, a support made of silicon;
an inorganic material integrated into an optical sensor; or
an inorganic material integrated into an optical fibre.

As mentioned hereinabove, the groups A comprise one or more aromatic rings, the or all or a portion of said aromatic rings comprising at least one imine substituent and the or all or a portion of said rings comprising at least one atom carrying a free doublet within the or all or a portion of said rings and/or at least one other substituent different from an imine substituent and comprising at least one atom carrying a free doublet, which cover the following situations:

the groups A comprise a single aromatic ring, said aromatic ring comprising at least one imine substituent and, furthermore, said aromatic ring comprising at least one atom carrying a free doublet within (which means, in other terms, that it is a heteroaromatic ring) and/or at least one other substituent different from an imine substituent and comprising at least one atom carrying a free doublet;

the groups A comprise several aromatic rings, all or a portion of said rings comprising at least one imine substituent and all or a portion of said rings comprising at least one atom carrying a free doublet within (which means, in other terms, that the ring or rings concerned are heteroaromatic rings) and/or at least one other substituent different from an imine substituent and comprising at least one atom carrying a free doublet.

The term "imine substituent" means a substituent corresponding to the following formula:

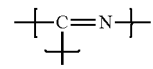

the two braces placed at the level of the carbon atom indicating that the latter is bonded to two other atoms in order to ensure the tetravalence thereof and the brace placed at the level of the nitrogen atom indicating that the latter is bonded to another atom in order to ensure the trivalence thereof. More specifically, for each imine substituent:

the carbon atom can be bonded, on the one hand, to a carbon atom of an aromatic ring and, on the other hand, to an atom, such as a hydrogen, a halogen atom or a group, such as an alkyl group; and the nitrogen atom can be bonded to the polymer or to an inorganic material, optionally, via an organic spacer group.

According to a first embodiment, the group or groups A each comprise one or more carbon aromatic rings (i.e. rings of which all the atoms constituting the rings are carbon atoms), the or all or a portion of said carbon aromatic rings comprising at least one imine substituent and the or all or a portion of said carbon aromatic rings comprising at least one atom carrying a free doublet at the level of at least one other substituent different from an imine substituent.

It is specified that the term substituent means an atom other than hydrogen or a group covalently bonded to an atom that constitutes the aromatic ring concerned.

Regarding the other substituent, for all embodiments, this can be a substituent comprising an oxygen atom, a sulphur atom and/or a nitrogen atom, preferably, an electron withdrawing substituent and with a mesomeric donor effect, such as a substituent comprising an oxygen atom, for example, a hydroxyl substituent.

In particular, the groups A can consist of a single carbon aromatic ring (i.e. a ring of which all the atoms constituting the ring are carbon atoms), for example, with six members (such as a phenyl group), with the understanding, in this case, that this ring carries both at least one imine substituent and at least one other substituent different from an imine substituent and comprising at least one atom carrying a free doublet (for example, an oxygen atom, a sulphur atom and/or a nitrogen atom), such as an electron withdrawing substituent and with a mesomeric donor effect, for example comprising an oxygen atom, such as a hydroxyl substituent.

More specifically, the groups A can consist of a single carbon aromatic ring, such as a phenyl group, carrying a single imine substituent and a single other substituent different from an imine substituent and comprising at least one atom carrying a free doublet (for example, an oxygen atom, a sulphur atom and/or a nitrogen atom), such as an electron withdrawing substituent and with a mesomeric donor effect, for example comprising an oxygen atom, such as a hydroxyl substituent, said imine substituent and the other substituent being in ortho position with respect to one another on the aromatic ring.

Furthermore, the aromatic ring can comprise one or more other substituents, than those mentioned hereinabove, for example, substituents chosen from halogen atoms, alkyl groups, alkoxy groups, ester groups.

By way of example of group(s) A, mention can be made of a group corresponding to the following formula (I):

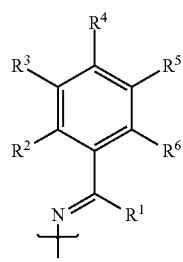

(I)

wherein:

R$^1$ represents a hydrogen atom or an alkyl group, preferably, a hydrogen atom;

R$^2$ represents a substituent comprising an electron withdrawing oxygen atom and with a mesomeric donor effect, such as a hydroxyl substituent;

R$^3$ to R$^6$ represent, independently of one another, a hydrogen atom, an alkyl group, an alkoxy group, an ester group, the brace indicating the location through which the group A is bonded to the material either directly (which means that the nitrogen atom is directly covalently bonded to the material) or via an organic spacer group (which means that the organic spacer group forms a bridge between the nitrogen atom and the material).

More specifically, at least one of the groups R$^3$ to R$^6$ is an ester group and, even more specifically, a single one of the groups R$^3$ to R$^6$ is an ester group, the other groups being a hydrogen atom.

A group A corresponding to these specificities is a group having the following formula (II):

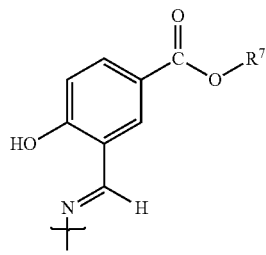

(II)

wherein R$^7$ represents an alkyl group and the brace indicating the location through which the group A is bonded to the material either directly (which means that the nitrogen atom is directly covalently to the material) or via an organic spacer group (which means that the organic spacer group forms a bridge between the nitrogen atom and the material).

According to a second embodiment, the group or groups A comprise, each, one or more aromatic rings, the or all or a portion of said aromatic rings comprising at least one imine substituent and the or all or a portion of said rings comprising, within them, at least one atom carrying a free doublet, such as an oxygen atom, such as an nitrogen atom and/or a sulphur atom (which means, in other terms, that the aromatic ring or all or a portion of said aromatic rings are heteroaromatic rings).

More specifically, the group or groups A can consist of a single aromatic ring comprising, within, at least one atom carrying a free doublet, such as an oxygen atom, such as an nitrogen atom and/or a sulphur atom (which means, in other terms, that the aromatic ring is a heteroaromatic ring) and, even more specifically, can consist of a single aromatic ring comprising, within, two atoms carrying a free doublet, such as an oxygen atom, such as an nitrogen atom and/or a sulphur atom, with the understanding that the aromatic ring also comprises at least one imine substituent.

Advantageously, the group or groups A can consist of a ring chosen from thiazoles, oxazoles, imidazoles, isoxazoles, pyrazoles.

As examples of group(s) A consisting of a thiazole ring, mention can be made of the group having the following formula (III):

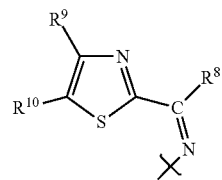

(III)

wherein:

R$^8$ represents a hydrogen atom or an alkyl group, preferably, a hydrogen atom;

R$^9$ and R$^{10}$ represent, independently of one another, a hydrogen atom, an electron donor group (or electron-donating), such as an alkyl group;

the brace indicating the location through which the group A is bonded to the material either directly (which means that the nitrogen atom is directly covalently to the material) or via an organic spacer group (which means that the organic spacer group forms a bridge between the nitrogen atom and the material).

A specific group A corresponding to these specificities can be a group corresponding to one of the following formulas (IV) to (VI):

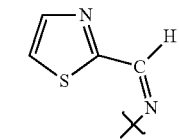
(IV)

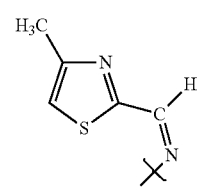
(V)

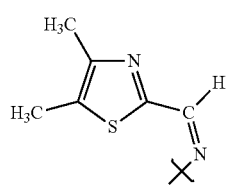
(VI)

the brace, in each one of these formulas, indicating the location through which the group A is bonded to the material either directly (which means that the nitrogen atom is directly covalently to the material) or via an organic spacer group (which means that the organic spacer group forms a bridge between the nitrogen atom and the material).

As examples of group(s) A consisting of an oxazole ring, mention can be made of the group having the following formula (VII):

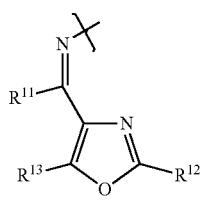
(VII)

wherein:

$R^{11}$ represents a hydrogen atom or an alkyl group, preferably, a hydrogen atom;

$R^{12}$ and $R^{13}$ represent, independently of one another, a hydrogen atom, an electron donor group (or electron-donating), such as an alkyl group;

the brace indicating the location through which the group A is bonded to the material either directly (which means that the nitrogen atom is directly covalently to the material) or via an organic spacer group (which means that the organic spacer group forms a bridge between the nitrogen atom and the material).

A specific group A corresponding to these specificities can be a group corresponding to the following formula (VIII):

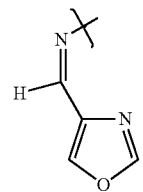
(VIII)

the brace indicating the location through which the group A is bonded to the material either directly (which means that the nitrogen atom is directly covalently to the material) or via an organic spacer group (which means that the organic spacer group forms a bridge between the nitrogen atom and the material).

As examples of group(s) A consisting of an imidazole ring, mention can be made of the group having the following formula (IX):

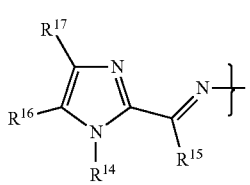
(IX)

wherein:

$R^{14}$ and $R^{15}$ represent, independently of one another, a hydrogen atom or an alkyl group, preferably, a hydrogen atom;

$R^{16}$ and $R^{17}$ represent, independently of one another, a hydrogen atom, an electron donor group (or electron-donating), such as an alkyl group;

the brace indicating the location through which the group A is bonded to the material either directly (which means that the nitrogen atom is directly covalently to the material) or via an organic spacer group (which means that the organic spacer group forms a bridge between the nitrogen atom and the material).

A specific group A corresponding to these specificities can be a group corresponding to the following formula (X):

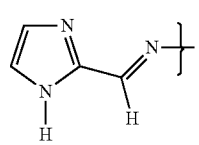
(X)

the brace indicating the location through which the group A is bonded to the material either directly (which means that the nitrogen atom is directly covalently to the material) or via an organic spacer group (which means that the organic spacer group forms a bridge between the nitrogen atom and the material).

As examples of group(s) A consisting of an isoxazole ring, mention can be made of the group having the following formula (XI):

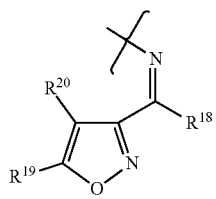

(XI)

wherein:
R[18] represents a hydrogen atom or an alkyl group, preferably, a hydrogen atom;
R[19] and R[20] represent, independently of one another, a hydrogen atom, an electron donor group (or electron-donating), such as an alkyl group;
the brace indicating the location through which the group A is bonded to the material either directly (which means that the nitrogen atom is directly covalently to the material) or via an organic spacer group (which means that the organic spacer group forms a bridge between the nitrogen atom and the material).

A specific group A corresponding to these specificities can be a group corresponding to the following formula (XII):

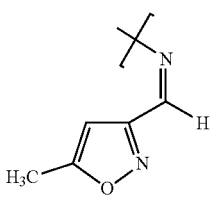

(XII)

the brace indicating the location through which the group A is bonded to the material either directly (which means that the nitrogen atom is directly covalently to the material) or via an organic spacer group (which means that the organic spacer group forms a bridge between the nitrogen atom and the material).

As examples of group(s) A consisting of a pyrazole ring, mention can be made of the group having the following formula (XIII):

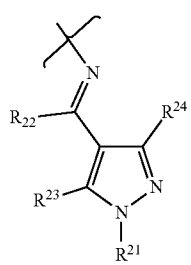

(XIII)

wherein:
R[21] and R[22] represent, independently of one another, a hydrogen atom or an alkyl group, preferably, a hydrogen atom;
R[23] and R[24] represent, independently of one another, a hydrogen atom, an electron donor group (or electron-donating), such as an alkyl group;

the brace indicating the location through which the group A is bonded to the material either directly (which means that the nitrogen atom is directly covalently to the material) or via an organic spacer group (which means that the organic spacer group forms a bridge between the nitrogen atom and the material).

A specific group A corresponding to these specificities can be a group corresponding to the following formula (XIV):

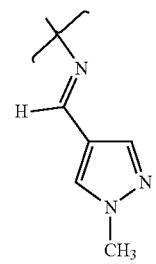

(XIV)

the brace indicating the location through which the group A is bonded to the material either directly (which means that the nitrogen atom is directly covalently to the material) or via an organic spacer group (which means that the organic spacer group forms a bridge between the nitrogen atom and the material).

As mentioned hereinabove, these materials can be used to detect an alkaline element in cationic form, such as lithium ions.

Thus, the invention relates to:
the use for the detection of at least one alkaline element in cationic form of a material in accordance with the invention such as defined hereinabove;
a method for detecting in a medium at least one alkaline element in cationic form implementing this material.

More specifically, the method for detecting in a medium at least one alkaline element in cationic form (for example, lithium ions) in accordance with the invention comprises the following steps:

a) after contact of the material with the medium, a step of visually comparing or of comparing by measuring a given optical magnitude between the material put into contact with the medium and the material that is not put into contact with the alkaline element or elements, of which it is sought to detect the presence;

b) from the results of step a), a step of deducing the presence or the absence of the alkaline element or elements.

When the material is not directly integrated into the medium, wherein it is sought to determine the presence of an alkaline element or elements, the method of detection comprises, in the first place, a step of putting the medium in contact, wherein it is desired to detect the presence of an alkaline element or elements in cationic form, with a material in accordance with the invention.

According to a first embodiment, the step of putting into contact can consist of putting the material in contact with the medium, said material being able to be solubilised in said medium, this putting into contact able to be accompanied with specific conditions concerning the pH of the medium (which can require adding a buffer solution to the medium to set the pH of the medium to a given value) in particular to induce the complexation of the material with the alkaline element or elements present, where applicable, in the medium.

According to a second embodiment, the step of putting into contact can consist in putting the material in contact with the medium, said material is insoluble with the medium, the material able to have different forms, such as:
- an inorganic material in the form of a support (for example, a flat support) functionalised by groups A such as defined hereinabove, such as a glass plate, a quartz plate or any other support (for example, a support made of silicon);
- an inorganic material integrated into an optical sensor, for example, a flat sensor;
- an inorganic material integrated into an optical fibre, said material being functionalised by groups A such as defined hereinabove;
- an organic material, for example, of the polymer type, functionalised by groups A such as defined hereinabove, this material able to be for example, a polymer material able to enter into the constitution of a battery separator, the luminescence or the absorbance linked to the groups A able to be probed using either a waveguide, or optical fibres placed on the separator.

The step of putting into contact is adapted for the methods wherein it entails detecting alkaline elements on a one-off basis, for example, in a medium originating from recycling methods, for example, batteries or a medium originating from a potentially polluted environment.

Alternatively, the material can be integrated directly, permanently, in the environment of the medium, that is sought to be analysed, which is the case when the detection consists of a following of the change in the quantity of alkaline elements in a given medium. This case can arise in particular when the method of detection consists in locally determining the concentration in an alkaline element or elements and even following the change in this concentration within an electrolyte medium of a metal alkaline-ion battery, in order to have an indication on its state of health, this type of detection able to be qualified as in situ detection.

After contact of the material with the medium, wherein it is desired to detect the presence of an alkaline element or elements, it is possible to carry out a step of visual comparison between the material put into contact with the medium and the material that is not put into contact with the alkaline element or elements, that is sought to be detected, and from the results of this comparison, the presence of an alkaline element or elements can be deduced, with the understanding that this visual comparison is pertinent only in cases where the change in colour takes place in the visible spectrum. Indeed, in case of a visual comparison, if a change in colour is observed between the material that is not put into contact with the alkaline element or elements, for which it is sought to detect the presence and the material put into contact with the medium, this change in colour can be induced by a complexation reaction with the alkaline element or elements, thus attesting to their presence in the medium. In case of absence of a change in colour, this can be linked to the absence of an alkaline element or elements in the medium. In order for this step of visual comparison to be reliable, tests can be conducted beforehand to establish the change in colour, that occurs in the presence of an alkaline element or elements, for which it is sought to determine the presence or the absence in a given medium. To do this, these prior tests can consist of putting the material in contact with a medium containing alkaline elements, in order to observe the change in colour of said material, with this change in colour then being used as a basis for comparison for the aforementioned step of visual comparison.

As an alternative to the step of visual comparison, a step of optical measurement can be carried out and, more specifically, a step of comparison by measuring a given optical magnitude between the material put into contact with the medium and the material that is not put into contact with the alkaline element or elements, of which it is sought to detect the presence, with this optical magnitude able to be the absorbance or an emission of fluorescence, with this step of optical measurement being particularly suitable when the optical phenomena occur in the non-visible spectrum (such as the UV spectrum or the infrared spectrum).

Regarding the absorbance, the latter consists of measuring, using a spectrophotometer, the absorbance value or optical density value of the material put into contact with the medium and of comparing the absorbance value obtained with that of the same material not put into contact with the alkaline element or elements, that is sought to be detected, with a difference between these two values indicating that the medium to be analysed does indeed comprise alkaline elements. Note that with this technique, it is also possible to quantify the concentration in alkaline elements present in the medium to be analysed by having a calibration curve which makes it possible to link the absorbance of the material according to the concentration in alkaline elements and to thus recover the concentration in an alkaline element or elements in the medium to be analysed.

Regarding the emission of fluorescence, the latter consists of measuring, after absorption of a light energy (referred to as excitation light) by the material put into contact with the medium, the fluorescence light returned by the material (referred to as emitting light) in the form of an emission spectrum and compare this emission spectrum with that of the same material not put into contact with the alkaline element or elements, that is sought to be detected, with a difference between these two emission spectra indicating that the medium to be analysed indeed comprises alkaline elements. In the same way as for absorbance, it is possible to quantify the concentration in alkaline elements present in the medium to be analysed by having a calibration curve which makes it possible to link the light emission of the material according to the concentration in alkaline elements and to thus recover the concentration in alkaline elements in the medium to be analysed. Alternatively, it can be the measurement of the lifetime of the fluorescence to carry out the detection.

This comparison by measuring the optical magnitude is particularly suited for the following cases:
- the case disclosed in the first embodiment hereinabove, wherein the material is solubilised in the medium to be analysed;
- the case disclosed in the second embodiment hereinabove, wherein the material has the form of a support functionalised by the groups A, such that a plate, by means of which it is possible, using the optical response of the latter and by knowing the quantity of groups A functionalising the surface thereof, to recover a detection and quantification of the alkaline elements present in the medium;
- the case disclosed in the second embodiment hereinabove, wherein the material has the form of an optical fibre, with the measurement of the optical magnitude able to be carried out via an optical probe. More specifically, when the optical magnitude is an emission of fluorescence and the optical fibre is a return fibre, it can be considered to send the excitation light in the fibre and to collect the emitting light emitted by the groups A and to recover the detection and the quantification of the alkaline elements according to the same principles as those disclosed hereinabove. This case can be considered for the detection of alkaline elements in liquid electrolytes contained in a battery, with the optical fibre able to be placed at different locations of the battery (for example, between the electrodes in contact with a separator, in the separator or if the fibre is thin enough, in one of the electrodes).

This comparison by measuring the optical magnitude is also suitable for the case where the material is directly integrated, permanently, in the environment of the medium, that is sought to be analysed, for example, in the form of a sensor, for example, in a lithium-ion battery, this sensor able to be a flat sensor that is sufficiently small and arranged on an inert substrate with respect to the environment of the battery and connected to an optical probe, the whole able to be placed in the winding for batteries with a coiled architecture or in the stack for batteries with a planar architecture. The material can also be directly integrated into the separator or separators of the battery, the groups A being linked to the polymer material forming the separator or can be integrated in the form of a layer on the surface of the separator or separators.

Moreover, it can also be considered to implement other optical techniques for the step of comparison. When the material intended to be functionalised is integrated into an optical fibre, it is possible to locally suppress or modify on the surface of the fibre the optical sheath thereof which will create zones that make it possible to generate evanescent waves by a change in the index. If on these zones, the functionalisation for the detection of the alkaline element or elements is carried out, it will be possible in the same way to detect and quantify this or these alkaline elements. Indeed, with this technique, it is possible locally probe the luminescence. It can be considered to combine this type of implementation with a detection by Bragg grating which provides other information such as the temperature and the local stress knowing that the two techniques (Bragg grating and luminescence) are not probed with the same wavelengths and are therefore optically compatible.

The method described hereinabove can also be implemented in the form of a flat substrate by using optical layers that form a waveguide and take the measurement in the same way.

Finally, the invention also relates to a metal alkaline-ion battery, such as a lithium-ion battery, comprising an electrochemical cell comprising a positive electrode, a negative electrode and an electrolyte arranged between said positive electrode and said negative electrode, the electrolyte being a liquid electrolyte comprising alkaline ions, characterised in that the cell further comprises a material in accordance with the invention such as defined hereinabove.

The term "positive electrode" means, in the above and in what follows, the electrode that acts as a cathode, when the battery is delivering current (i.e. when it is in the process of discharging) and which acts as an anode when the battery is in the process of charging.

The term "negative electrode" means, in the above and in what follows, the electrode that acts as an anode, when the battery is delivering current (i.e. when it is in the process of discharging) and which acts as a cathode, when the battery is in the process of charging.

The electrolyte is advantageously confined in a separator arranged between the positive electrode and the negative electrode, which furthermore allows for a physical separation between the latter.

This separator is, advantageously, made from a porous material able to receive in its porosity the liquid electrolyte.

This separator can consist of a membrane made of a material chosen from glass fibres (and more specifically, non-woven glass fibres), a polymeric material, such as a polyterephthalate (such as polyethylene terephthalate, known under the abbreviation PET), a polyolefin (for example, a polyethylene, a polypropylene), a polyvinyl alcohol, a polyamide, a polytetrafluoroethylene (known under the abbreviation PTFE), a polyvinyl chloride (known under the abbreviation PVC), a polyvinylidene fluoride (known under the abbreviation PVDF). The separator can have a thickness ranging from 5 to 300 µm. The separator can also be formed from several materials arranged in a sandwich (PE/PP/PE for example) having, optionally, a deposition on the surface of the inorganic type so as to reinforce its mechanical resistance. In particular depositions of alumina, zirconia or other oxides can be used to prevent short-circuits in case of dendritic growth of metal lithium (which corresponds to a process of degradation by Lithium plating).

More specifically, the liquid electrolyte comprises at least one organic solvent and at least one ion-conductive salt comprising alkaline ions, such as a lithium salt when the battery is a lithium-ion battery.

By way of examples of lithium salt, mention can be made of $LiClO_4$, $LiAsF_6$, $LiPF_6$, $LiBF_4$, $LiRfSO_3$, $LiCH_3SO_3$, $LiN(RfSO_2)_2$, Rf being chosen from F or a perfluoroalkyl group comprising from 1 to 8 carbon atoms, lithium (trifluoromethanesulfonyl)imide (known under the abbreviation LiTFSI), lithium bis(oxalato)borate (known under the abbreviation LiBOB), lithium bis(perfluoroethylsulfonyl)imide (also known under the abbreviation LiBETI), lithium fluoroalkylphosphate (known under the abbreviation LiFAP).

By way of examples of organic solvents able to enter into the constitution of the aforementioned electrolyte, mention can be made of carbonate solvents, such as cyclic carbonate solvents, linear carbonate solvents and the mixtures thereof.

By way of examples of cyclic carbonate solvents, mention can be made of ethylene carbonate (symbolised by the abbreviation EC), propylene carbonate (symbolised by the abbreviation PC).

By way of examples of linear carbonate solvents, mention can be made of dimethyl carbonate or diethyl carbonate (symbolised by the abbreviation DEC), dimethyl carbonate (symbolised by the abbreviation DMC), ethylmethyl carbonate (symbolised by the abbreviation EMC).

The negative electrode comprises, conventionally, as an electrode active material, a material that can be inserted, reversibly, lithium.

The positive electrode comprises, conventionally, an active material, i.e. a material that can intervene in the insertion and removal reactions that occur during the operation of the battery.

The material in accordance with the invention can be inserted at different locations of the cell, when these locations are in contact with the alkaline elements present in the electrolyte, for example, at the level of the separator and/or at least one of the electrodes.

Finally, the inventors have developed an innovating method for manufacturing the materials in accordance with the invention, this method involving the formation of the imine substituent in the presence of at least one supercritical fluid by condensation reaction between an amine function and a carbonyl function.

More specifically, according to a first embodiment, the method for manufacturing a material in accordance with the invention comprises a step of condensation reaction, in the presence of at least one supercritical fluid, between a precursor of the groups A comprising at least one carbonyl function and the material intended to be functionalised comprising at least one amine function, preferably, primary amine, whereby a material in accordance with the invention is obtained.

Thanks to the implementation of the condensation reaction in the presence of at least one supercritical fluid, the authors of the invention were able to reveal a faster reaction time than in the conventional solvent medium (for example, from 30 minutes to 3 hours with the supercritical fluid compared to several days, even 1 week with the medium in a conventional solvent).

The term "supercritical fluid" means a fluid brought to a pressure and a temperature above its critical point, corresponding to the temperature and pressure pair (respectively Tc and Pc), for which the liquid phase and the gaseous phase have the same density and above which the fluid is in its supercritical range. In supercritical conditions, the fluid has a very high dissolution power with respect to the same fluid in supercritical conditions and facilitates as such the solubilisation of the reagents which thus facilitates the reactivity between them.

Preferably, whether for this embodiment or for other embodiments, the step of reaction is implemented in the presence of a single supercritical fluid, which is, preferably, supercritical $CO_2$, in particular due to its low critical temperature (31° C.), which makes it possible to implement the reaction at low temperature without the risk of degrading the reactions put into presence. More precisely, the supercritical $CO_2$ is obtained by heating carbon dioxide beyond its critical temperature (31° C.) and by compressing it above its critical pressure (73 bars). What is more, the supercritical $CO_2$ is non-flammable, non-toxic, relatively inexpensive and does not require retreatment at the end of the method, compared to methods that involve the use of organic solvent.

When the supercritical fluid used is supercritical $CO_2$, the temperature and pressure conditions can be, in particular, 105° C. and 260 bars.

The precursor of the groups A correspond to the same definition as the groups A defined hereinabove, if only that the imine function or functions are replaced with one or more carbonyl functions. In other words, the precursor of the groups A can be defined as being a compound comprising one or more aromatic rings, the or all or a portion of said aromatic rings comprising at least one carbonyl substituent and the or all or a portion of said rings comprising at least one atom carrying a free doublet within the or all or a portion of said rings and/or at least one other substituent different from a carbonyl substituent and comprising at least one atom carrying a free doublet.

Other than the carbonyl substituent replacing the imine substituent, the different variations disclosed for defining the groups A are also valid for defining the precursor.

By way of examples:
when the group or groups A correspond to the formula (II) with $R^7$ corresponding to an ethyl group, the precursor corresponds to ethyl 3-formyl-4-hydroxybenzoate (having a melting point ranging from 67 to 73° C.);
when the group or groups A correspond to the formula (IV), the precursor corresponds to 2-thiazolecarboxaldehyde;
when the group or groups A correspond to the formula (V), the precursor corresponds to 4-methyl-2-thiazolecarboxaldehyde;
when the group or groups A correspond to the formula (VI), the precursor corresponds to 4,5-dimethylthiazole-2-carboxaldehyde;
when the group or groups A correspond to the formula (VIII), the precursor corresponds to 4-oxazolecarboxaldehyde;
when the group or groups A correspond to the formula (X), the precursor corresponds to 2-imidazolecarboxaldehyde;
when the group or groups A correspond to the formula (XI), the precursor corresponds to 5-methylisoxazole-3-carboxaldehyde;
when the group or groups A correspond to the formula (XIV), the precursor corresponds to 1-methyl-1H-pyrazole-4-carboxaldehyde.

Advantageously, the precursor or the precursors are soluble in the supercritical fluid or fluids used and have, preferably, a lipophilic character.

Advantageously, whether for this embodiment or for other embodiments, the precursor or precursors have a melting temperature less than the processing temperature the step of condensation reaction in the presence of at least one supercritical fluid and, more specifically, the melting temperature of the precursor or precursors can be less than 120° C.

Moreover, the precursor or the precursors advantageously have a chromophore nature.

The material comprising at least one amine function can be a polymer carrying pendant amine groups, such as a polymer from the chitosan family.

According to a second embodiment, the method for manufacturing a material in accordance with the invention comprises the following steps:
a step of condensation reaction, in the presence of at least one supercritical fluid, between a precursor of the groups A comprising at least one carbonyl substituent and a compound comprising at least one amine function, preferably primary amine (which has the particularity of being rich in electrons), and at least one function able to react, covalently, with a function belonging to the material intended to be functionalised, said resulting compound comprising a group A comprising at least one imine function bonded to a remainder of the compound initially comprising at least one amine function, said remainder comprising at least one function able to react, covalently, with a function belonging to the material intended to be functionalised;
a step of reacting of the compound resulting from the step of condensation reaction with the material intended to be functionalised, whereby a material in accordance with the invention is obtained.

The precursor of the groups A can be defined such as the one defined in the framework of the first embodiment.

The compound comprising at least one amine function and at least one function able to react, covalently, with a function belonging to the material intended to be functionalised can be in particular a silane compound comprising at least one group carrying at least one $-NH_2$ function and at least one hydrolysable function, such as an alkoxy function.

By way of example, such a compound can be the compound 3-aminopropyltriethoxysilane (also known under the abbreviation APTES) having the following formula:

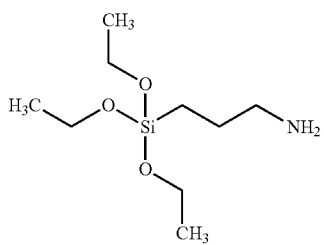

If the precursor of group A is used (ethyl 3-formyl-4-hydroxybenzoate), the reaction with APTES leads to the compound having the following formula:

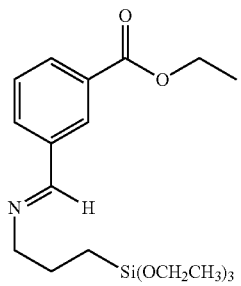

With compounds of the silane type including hydrolysable functions, such as alkoxy, the material intended to be functionalised and particularly suitable can be an inorganic material of the silica type, the reaction between the silica and the silane compound able to consist of a hydrolysis-condensation reaction, allowing for the covalent grafting of said compound on the silica.

Other characteristics and advantages of the invention shall appear from the following description supplement that relates to two embodiments.

Of course, the description supplement is given solely for the purposes of illustration of the invention and in no way constitutes a limitation thereof.

DETAILED DESCRIPTION OF PARTICULAR EMBODIMENTS

Example 1

Figure 1:
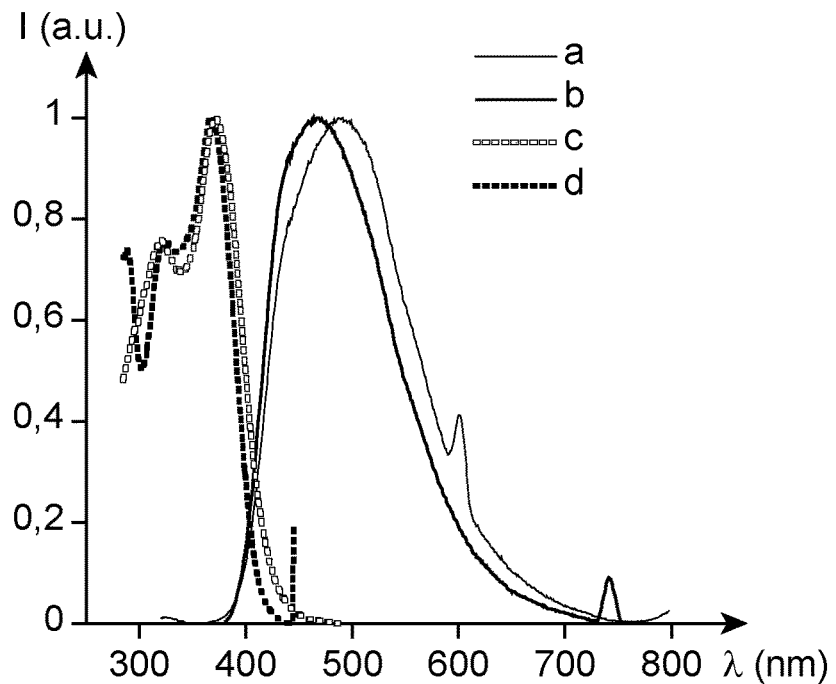
FIG. 1 is a graph showing the change in the intensity I (in arbitrary units a.u) of the absorbance spectrum according to the wavelength A (in nm) for the solution S1 (curve a for the emission at 300 nm and curve b for the emission at 371 nm) and of the fluorescence spectrum for the solution S1 (curve c for the excitation at 500 nm and curve d for the excitation at 450 nm).

This example shows the preparation of a material in accordance with the invention corresponding to the following simplified formula:

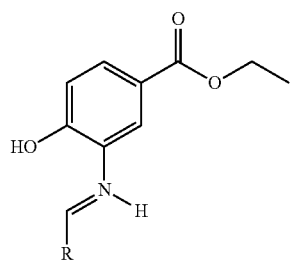

R representing a remainder of chitosan.

For reasons of simplification, a single ethyl 3-imino-4-hydroxybenzoate group was shown but it is understood that all or a portion of the —$NH_2$ groups initially present on the chitosan are replaced with this group.

The reaction scheme for the preparation of this material is as follows:

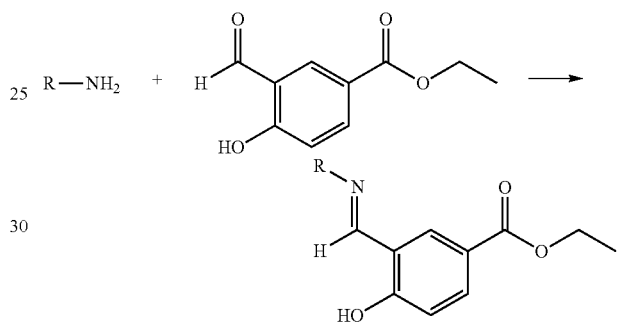

R—$NH_2$ representing a chitosan (a single —$NH_2$ group being shown for reasons of simplification).

This reaction thus consists in a condensation reaction between primary amine groups (rich in electrons) carried by the chitosan and a chromophore aromatic molecule: ethyl 3-formyl-4-hydroxybenzoate having a low melting point (67-73° C.) and a lipophilic character thanks to the presence of the ethyl benoate group.

The condensation reaction is carried out in supercritical conditions and, more specifically, the aforementioned reagents are put into the presence of supercritical $CO_2$ under a pressure of 260 bar, a temperature of 105° C. and a duration of 3 hours.

The material resulting from this reaction and in accordance with the invention is a material with a yellow colour (although the starting reagents are colourless), which attests a change in the system conjugated Π via the formation of the imine function.

Example 2

This example aims to demonstrate the reliability of the materials in accordance with the invention, and more specifically, the material prepared according to the example 1 hereinabove for the detection of lithium ions.

To do this, in a first time, the following solutions were prepared:

a solution referred to as "S0" constituted of an electrolyte comprising a mixture of ethylene carbonate (EC) and of diethylene carbonate (DEC) (50/50) and a lithium salt ($LiPF_6$) at 1M;

a solution referred to as "S1" formed from a mixture of ethylene carbonate (EC) and of diethylene carbonate (DEC) (50/50), wherein were added 2.74% by weight of the material of the example 1;

a solution referred to as "S2" of an electrolyte comprising a mixture of ethylene carbonate (EC) and of diethylene carbonate (DEC) (50/50) and a lithium salt (LiPF$_6$) at 1M, wherein were added 2.74% by weight of the material of the example 1.

These solutions were all prepared in a glove box under nitrogen and without humidity, in order to be in an anhydrous medium as is the case in a lithium-ion battery environment, wherein the type of electrolyte mentioned hereinabove is commonly used.

In a second step, the solutions thus prepared are subjected to visual observation. The result of this observation is that the solution S2 has undergone a change in colour from yellow to pink, which is the sign of a reaction, that could be linked to the presence of lithium. The solution S1, retains its yellow colour, while the solution S0 remains transparent.

Finally, in a third step, the solutions S1 and S2 are subjected to measurements of absorbance and fluorescence, so as to qualify the capacity of the material in detecting the presence of lithium ions.

Figure 2:
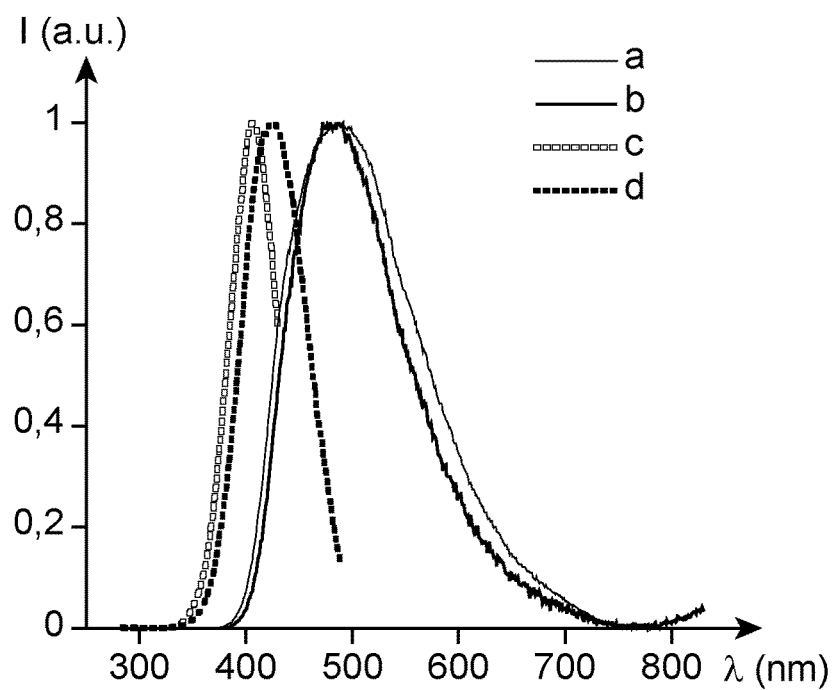
FIG. 2 is a graph showing the change in the intensity I (in arbitrary units a.u) of the absorbance spectrum according to the wavelength A (in nm) for the solution S2 (curve a for the emission at 350 nm and curve b for the emission at 371 nm) and of the fluorescence spectrum for the solution S2 (curve c for the excitation at 500 nm and curve d for the excitation at 450 nm).

The results are reported in the accompanying FIGS. 1 and 2:

FIG. 1 shows the change in the intensity I (in arbitrary units a.u) of the absorbance spectrum according to the wavelength λ (in nm) for the solution S1 (curve a for the emission at 300 nm and curve b for the emission at 371 nm) and of the fluorescence spectrum for the solution S1 (curve c for the excitation at 500 nm and curve d for the excitation at 450 nm);

FIG. 2 shows the change in the intensity I (in arbitrary units a.u) of the absorbance spectrum according to the wavelength λ (in nm) for the solution S2 (curve a for the emission at 350 nm and curve b for the emission at 371 nm) and of the fluorescence spectrum for the solution S2 (curve c for the excitation at 450 nm and curve d for the excitation at 500 nm).

These figures clearly show a modification of the absorbance spectrum and of the fluorescence spectrum for the solution S2 with respect to the solution S1, which does not contain lithium ions. This attests the capacity of the material in accordance with the invention to complex the lithium ions and to simultaneously modify the fluorescence thereof, which also demonstrates its capacity to trace the presence of lithium ions.

The invention claimed is:

1. A material for the detection of at least one alkaline element in cationic form, the material selected from the group consisting of polymers and inorganic materials, wherein the material comprises one or more group(s) A, each group A comprising, independently, one or more aromatic ring(s), wherein the one or more aromatic ring(s) comprise at least one imine substituent and at least one atom carrying a free doublet and/or at least one other substituent different from an imine substituent and comprising at least one atom carrying a free doublet, wherein the one or more group(s) A comprises a first group A comprising the following formula (II):

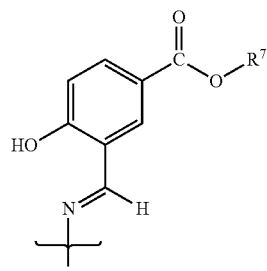

(II)

wherein R$^7$ represents an alkyl group, the brace indicating the location through which the first group A is bonded to the material either directly or via an organic spacer group.

2. The material according to claim 1, wherein the one or more group(s) A further comprises a second group A, said second group A comprising one or more aromatic rings comprising at least one imine substituent and at least one atom carrying a free doublet selected from the group consisting of an oxygen atom, a nitrogen atom and a sulphur atom.

3. The material according to claim 2, wherein the second group A consists of a single aromatic ring comprising at least one atom carrying a free doublet selected from the group consisting of an oxygen atom, a nitrogen atom and a sulphur atom.

4. The material according to claim 2, wherein the second group A consists of a single aromatic ring comprising, two atoms carrying a free doublet selected from the group consisting of an oxygen atom, a nitrogen atom and a sulphur atom.

5. The material according to claim 1, wherein the one or more group(s) A further comprises a second group A, wherein the second group(s) A consists of a ring chosen from thiazoles, oxazoles, imidazoles, isoxazoles, and pyrazoles.

6. The material according to claim 5, wherein the second group A consists of a thiazole ring having the following formula (III):

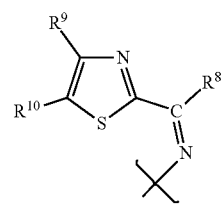

(III)

wherein:

R$^8$ represents a hydrogen atom or an alkyl group;

R$^9$ and R$^{10}$ represent, independently of one another, a hydrogen atom or an electron donor group;

the brace indicating the location through which the second group A is bonded to the remainder of the material either directly or via an organic spacer group.

7. The material according to claim 5, wherein the second group A consists of an oxazole ring corresponding to the following formula (VII):

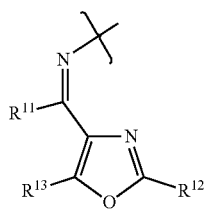

(VII)

wherein:
R$^{11}$ represents a hydrogen atom or an alkyl group;
R$^{12}$ and R$^{13}$ represent, independently of one another, a hydrogen atom, or an electron donor group;
the brace indicating the location through which the second group A is bonded to the remainder of the material either directly or via an organic spacer group.

8. The material according to claim 5, wherein the second group A consists of an imidazole ring corresponding to the following formula (IX):

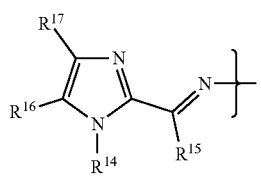

(IX)

wherein:
R$^{14}$ and R$^{15}$ represent, independently of one another, a hydrogen atom or an alkyl group;
R$^{16}$ and R$^{17}$ represent, independently of one another, a hydrogen atom, or an electron donor group;
the brace indicating the location through which the second group A is bonded to the remainder of the material either directly or via an organic spacer group.

9. The material according to claim 5, wherein the second group A consists of an isoxazole ring corresponding to the following formula (XI):

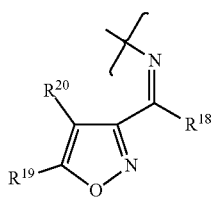

(XI)

wherein:
R$^{18}$ represents a hydrogen atom or an alkyl group;
R$^{19}$ and R$^{20}$ represent, independently of one another, a hydrogen atom, or an electron donor group;
the brace indicating the location through which the second group is bonded to the remainder of the material either directly or via an organic spacer group.

10. The material according to claim 5, wherein the second group A consists of a pyrazole ring corresponding to the following formula (XIII):

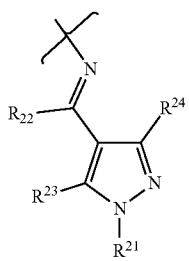

(XIII)

wherein:
R$_{21}$ and R$_{22}$ represent, independently of one another, a hydrogen atom or an alkyl group;
R$_{23}$ and R$_{24}$ represent, independently of one another, a hydrogen atom or an electron donor group;
the brace indicating the location through which the second group A is bonded to the material either directly or via an organic spacer group.

11. The material according to claim 1, which is a material belonging to the chitosan family.

12. The material according to claim 1, which is a polymer material belonging to the family of polyterephthalate polymers, polyolefins, polyvinyl alcohols, polyamides, polytetrafluoroethylenes, polyvinyl chlorides, or polyvinylidene fluorides.

13. The material according to claim 1, which is an inorganic material chosen from:
materials made of one or more metalloid elements; and
materials made of an oxide of one or more metal or metalloid elements.

14. The material according to claim 1, which is:
an inorganic material in the form of a glass plate, silicon plate or quartz plate;
an inorganic material integrated into an optical sensor;
an inorganic material integrated into an optical fibre; or
an organic polymer.

15. A method for detection of at least one alkaline element in cationic form, the method comprising:
a) contacting the material as defined in claim 1 with a medium to be tested for the presence or absence of the at least one alkaline element in cationic form,
b) detecting the presence of the at least one alkaline element in cationic form by visually comparing or by measuring optical magnitudes of i) the material put into contact with the medium and ii) the material as defined in claim 1 that has not been put into contact with the at least one alkaline element which presence is being detected;
c) determining the presence or the absence of the at least one alkaline element based on the visual comparison or the measurement of the optical magnitudes of i) and ii).

16. The method according to claim 15, which is a method for detecting lithium ions.

17. An alkaline-ion metal battery comprising an electrochemical cell comprising a positive electrode, a negative electrode and an electrolyte arranged between said positive electrode and said negative electrode, the electrolyte being a liquid electrolyte comprising alkaline ions, wherein the cell further comprises a material defined according to claim 1.

18. A method for manufacturing the material for the detection of at least one alkaline element in cationic form defined according to claim 1, said method comprises a condensation reaction in the presence of at least one supercritical fluid to obtain the materials for the detection of at least one alkaline element in cationic form comprising the one or more group(s) A, each group A comprises independently, the one or more aromatic ring(s), wherein the one or more aromatic ring(s) comprises at least one imine substituent and at least one atom carrying a free doublet and/or at least one other substituent different from an imine substituent and comprising at least one atom carrying a free doublet, wherein the one or more group(s) A comprises a first group A comprising the following formula (II):

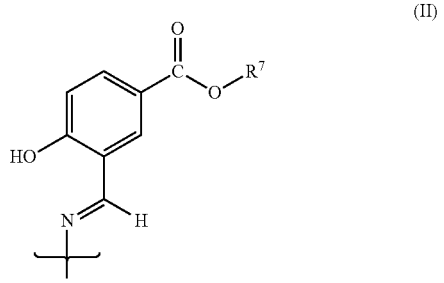

(II)

wherein $R^7$ represents an alkyl group, the brace indicating the location through which the first group A is bonded to a remainder of the material either directly or via an organic spacer group, the condensation reaction being between a precursor of the one or more group(s) A, wherein the precursor comprises at least one carbonyl function, and a material to be functionalised, wherein the material to be functionalised comprises at least one amine function, to obtain the material for the detection of at least one alkaline element in cationic form.

19. The method for manufacturing the material for the detection of at least one alkaline element in cationic form defined according to claim 1, comprising the following steps:
a condensation reaction in the presence of at least one supercritical fluid, the condensation reaction being between a) a precursor of the one or more group(s) A, wherein the precursor comprises at least one carbonyl function, and b) a compound comprising at least one amine function and further comprising a first moiety to be reacted covalently with a second moiety of the material to be functionalised, to form a condensation product, wherein the condensation product comprises one or more group(s) A bonded to a remainder of the compound by an imine;

reacting the first moiety of the condensation product with the second moiety of the material to be functionalised to obtain the material for the detection of at least one alkaline element in cationic form comprising the one or more group(s) A, each group A comprises, independently, the one or more aromatic ring(s), wherein the one or more aromatic ring(s) comprising at least one imine substituent and at least one atom carrying a free doublet and/or at least one other substituent different from an imine substituent and comprising at least one atom carrying a free doublet, wherein the one or more group(s) A comprises a first group A comprising the following formula (II);

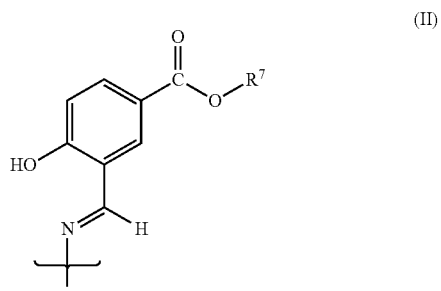

(II)

wherein $R^7$ represents an alkyl group, the brace indicating the location through which the first group A is bonded to a remainder of the material either directly or via an organic spacer group.

20. The method according to claim 19, wherein the condensation reaction is implemented in the presence of a single supercritical fluid which is supercritical $CO_2$.

21. The method according to claim 19, wherein the precursor has a melting temperature less than 120° C.

* * * * *